US012789267B2

(12) United States Patent
Bernaden et al.

(10) Patent No.: US 12,789,267 B2
(45) Date of Patent: Nov. 10, 2026

(54) HOLE SAW ARBOR ASSEMBLY

(71) Applicant: MILWAUKEE ELECTRIC TOOL CORPORATION, Brookfield, WI (US)

(72) Inventors: Zachary D. Bernaden, Milwaukee, WI (US); Milorad Marich, Mequon, WI (US); Jason M. Thom, Wauwatosa, WI (US); Jonathan G. Winter, Burlington, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 755 days.

(21) Appl. No.: 18/041,611

(22) PCT Filed: Aug. 18, 2021

(86) PCT No.: PCT/US2021/046523
§ 371 (c)(1),
(2) Date: Feb. 14, 2023

(87) PCT Pub. No.: WO2022/040326
PCT Pub. Date: Feb. 24, 2022

(65) Prior Publication Data

US 2023/0347425 A1 Nov. 2, 2023

Related U.S. Application Data

(60) Provisional application No. 63/124,214, filed on Dec. 11, 2020, provisional application No. 63/066,931, filed on Aug. 18, 2020.

(51) Int. Cl.
*B23B 51/04* (2006.01)

(52) U.S. Cl.
CPC ...... *B23B 51/0473* (2013.01); *B23B 51/0426* (2013.01); *B23B 2260/136* (2013.01)

(58) Field of Classification Search
CPC ....... B23B 31/11; B23B 31/12; B23B 31/117; B23B 31/1173; B23B 31/1177;
(Continued)

(56) References Cited

U.S. PATENT DOCUMENTS

| | | | | |
|---|---|---|---|---|
| 2,794,353 A * | 6/1957 | Bashlow | B23B 49/003 | 408/113 |
| 4,148,593 A * | 4/1979 | Clark | B23B 51/0473 | 408/206 |

(Continued)

FOREIGN PATENT DOCUMENTS

KR 1020110134762 A 12/2011

OTHER PUBLICATIONS

International Search Report and Written Opinion for Application No. PCT/US2021/046523 dated Dec. 9, 2021 (10 pages).

*Primary Examiner* — Nicole N Ramos
(74) *Attorney, Agent, or Firm* — Michael Best & Friedrich LLP

(57) ABSTRACT

A cutting tool includes a hole saw and an arbor assembly removably coupled to the hole saw. The arbor assembly includes a shank having a first end, a second end opposite the first end and configured to be coupled to a power tool, a body between the first and second ends, and an longitudinal axis extending centrally through the shank between the first and second ends. The body includes a recess. The arbor assembly also includes a sleeve supported by the shank, the sleeve including a central bore that receives the shank and a locking member positioned in the central bore, the locking member formed as a single, monolithic piece with a remainder of the sleeve, the sleeve moveable between a first position, in which the locking member engages the recess, and a second position, in which the locking member is spaced apart from the recess.

9 Claims, 8 Drawing Sheets

(58) Field of Classification Search
CPC . B23B 31/1074; B23B 51/0473; B23B 51/12; B23B 51/0406; B23B 51/0426; B23B 2260/136
See application file for complete search history.

(56) References Cited

U.S. PATENT DOCUMENTS

| | | | | |
|---|---|---|---|---|
| 4,811,843 | A * | 3/1989 | Stribiak ................. | B23Q 13/00<br>206/349 |
| 7,001,116 | B2 * | 2/2006 | Kozak ................. | B23B 51/0473<br>408/68 |
| 8,876,444 | B1 * | 11/2014 | Chanturidze ......... | B23B 51/104<br>408/202 |
| 2005/0042048 | A1 | 2/2005 | Keightley | |
| 2009/0279972 | A1 | 11/2009 | Novak et al. | |
| 2014/0248101 | A1 * | 9/2014 | Kazda ................. | B23B 51/0473<br>408/239 R |
| 2016/0279717 | A1 * | 9/2016 | Batho ................. | B23B 51/0473 |
| 2017/0050241 | A1 | 2/2017 | Thomas et al. | |
| 2018/0085833 | A1 | 3/2018 | Ward | |

* cited by examiner

HOLE SAW ARBOR ASSEMBLY

CROSS REFERENCE TO RELATED APPLICATION

This application is a national stage filing under 35 U.S.C. § 371 of International Application No. PCT/US2021/046523, filed on Aug. 18, 2021, which claims the benefit of U.S. Provisional Patent Application Ser. No. 63/066,931, filed on Aug. 18, 2020, and U.S. Provisional Patent Application Ser. No. 63/124,214, filed on Dec. 11, 2020, the entire contents of all of which are incorporated by reference herein.

BACKGROUND

The present invention relates to arbor assemblies and, more particularly, to quick-release arbor assemblies for hole saws.

Typically, a hole saw is coupled to a rotating power tool using an arbor assembly. The arbor assembly generally includes a shank and an arbor. Some hole saw arbor assemblies include mechanisms to help quickly release and attach hole saws.

SUMMARY

In one embodiment, the invention provides a cutting tool including a hole saw and an arbor assembly removably coupled to the hole saw. The arbor assembly includes a shank having a first end, a second end opposite the first end and configured to be coupled to a power tool, a body between the first and second ends, and an longitudinal axis extending centrally through the shank between the first and second ends. The body includes a recess. The arbor assembly also includes a sleeve supported by the shank, the sleeve including a central bore that receives the shank and a locking member positioned in the central bore, the locking member formed as a single, monolithic piece with a remainder of the sleeve, the sleeve moveable between a first position, in which the locking member engages the recess, and a second position, in which the locking member is spaced apart from the recess.

In another embodiment, the invention provides an arbor assembly for a hole saw. The arbor assembly includes a shank having a first end, a second end opposite the first end and configured to be coupled to a power tool, a body between the first and second ends, and a longitudinal axis extending centrally through the shank between the first and second ends. The shank also includes a recess. The arbor assembly also includes a sleeve supported by the shank including a body, a central bore to receive the shank, and a locking member disposed within the central bore. The locking member is formed as a single, monolithic piece with a remainder of the sleeve and being naturally biased towards the longitudinal axis to engage the recess.

In another embodiment, the invention provides a sleeve for an arbor assembly of a cutting tool. The sleeve includes a body and a central bore extending through the body. The central bore defines a longitudinal axis extending centrally through the body. The sleeve also includes a locking member disposed within the central bore. The locking member includes a cantilevered leaf spring formed as a single, monolithic piece with the body. The locking member is naturally biased towards the longitudinal axis.

Other aspects of the invention will become apparent by consideration of the detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

DETAILED DESCRIPTION

Figure 1:
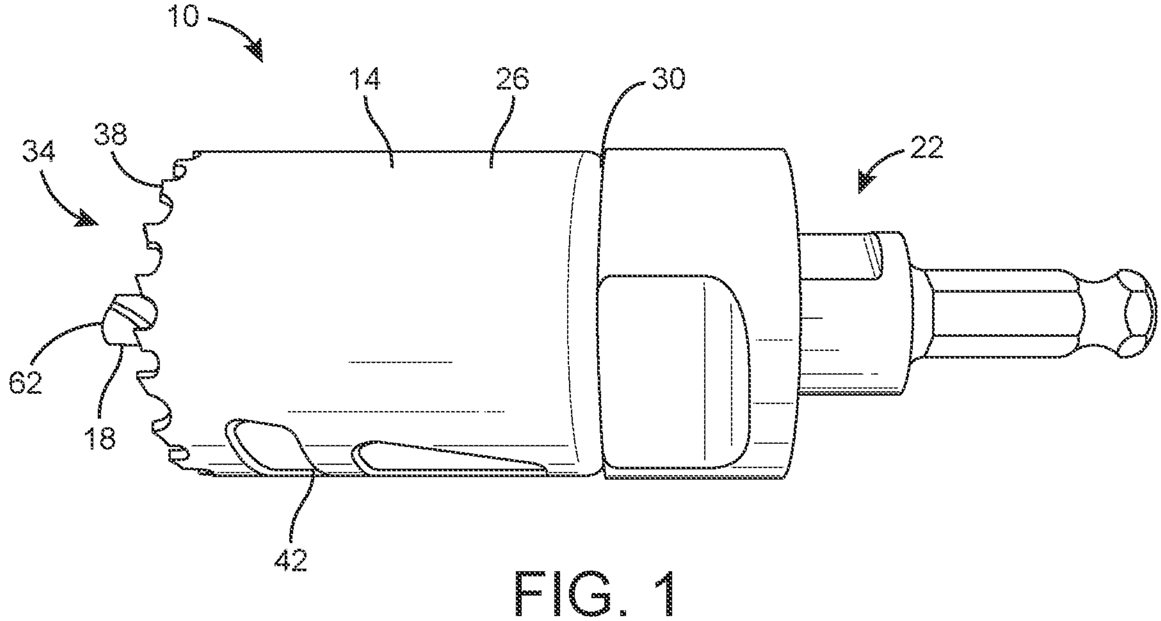
FIG. 1 is a perspective view of a cutting tool.

FIG. 1 illustrates a cutting tool 10 including a hole saw 14, a pilot bit 18, and an arbor assembly 22. Both the hole saw 14 and the pilot bit 18 are removably coupled to the arbor assembly. Thus, the arbor assembly 22 allows different types and/or sizes of hole saws and pilot bits to be interchangeably coupled to the arbor assembly 22. Furthermore, if one part should fail first (e.g., the arbor assembly 22, the pilot bit 18, or the hole saw 14), a user can remove and replace that part instead of needing to throw away the entire cutting tool 10. In some embodiments, the pilot bit 18 may be omitted such that the cutting tool 10 only includes the hole saw 14 and the arbor assembly 22.

The hole saw 14 includes a generally cylindrical body 26 having a first or closed end 30 and a second or open end 34. The closed end 30 is configured to mount to the arbor assembly 22 for connecting the hole saw 14 to a power tool (e.g., a drill). The open end 34 includes a toothform 38 that is configured to cut through a work piece. In the illustrated embodiment, the toothform 38 is defined by a repeating pattern of cutting teeth and gullets. In other embodiments, the toothform 38 may have other configurations. At least one opening 42 is formed in the body 26 of the illustrated hole saw 14 between the closed and open ends 30, 34 to facilitate chip and plug removal form the hole saw 14. Although not shown, the hole saw 14 includes an end cap coupled to the cylindrical body 26. The end cap may include one or more apertures. The apertures in the end cap receive portions of the arbor assembly 22 to secure the hole saw 14 to the arbor assembly 22.

Figure 2:
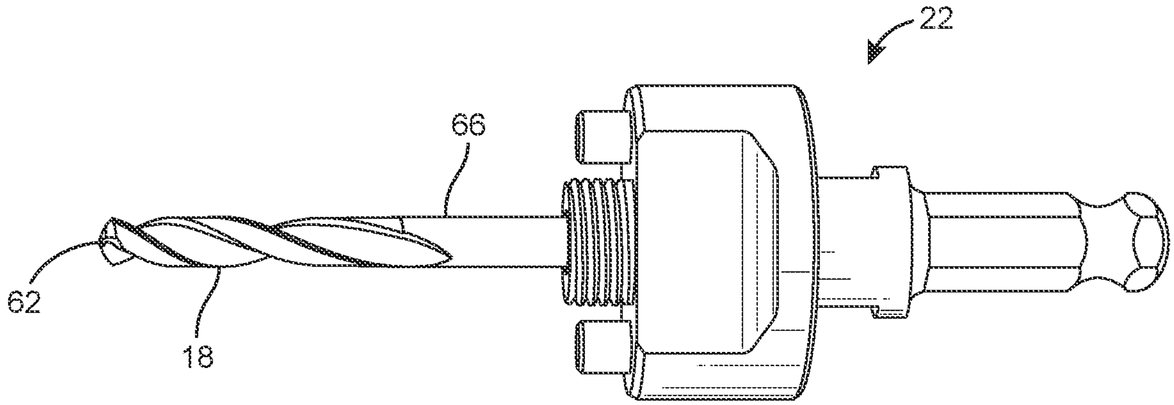
FIG. 2 is a plan view of the cutting tool of FIG. 1 with a hole saw removed.

Referring to FIG. 2, the pilot bit 18 is coupled to the arbor assembly 22 and surrounded by the hole saw 14. The pilot bit 18 includes a cutting portion 62 and a shaft 66. The cutting portion 62 extends beyond the open end 34 of the cylindrical body 26. The shaft 66 is generally hex-shaped. The shaft 66 is received by the arbor assembly 22. In the illustrated embodiment, the pilot bit 18 is a twist drill bit. In other embodiments, the pilot bit 18 may be other types of drill bits, such as a spade bit. The hole saw 14 and the pilot bit 18 are both removable from the arbor assembly 22 separately or simultaneously.

Figure 3:
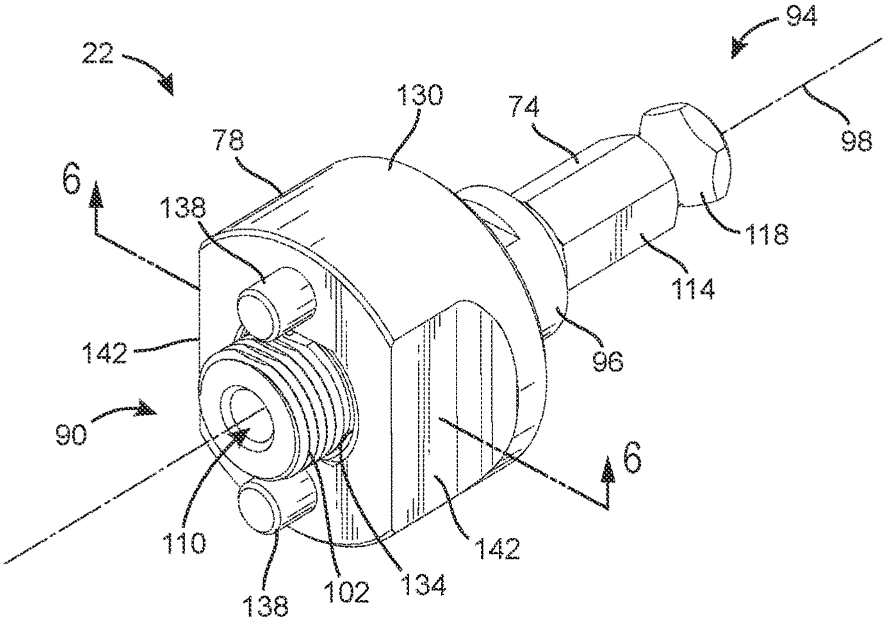
FIG. 3 is a perspective view of an arbor assembly of the cutting tool of FIG. 1.
Figure 4:
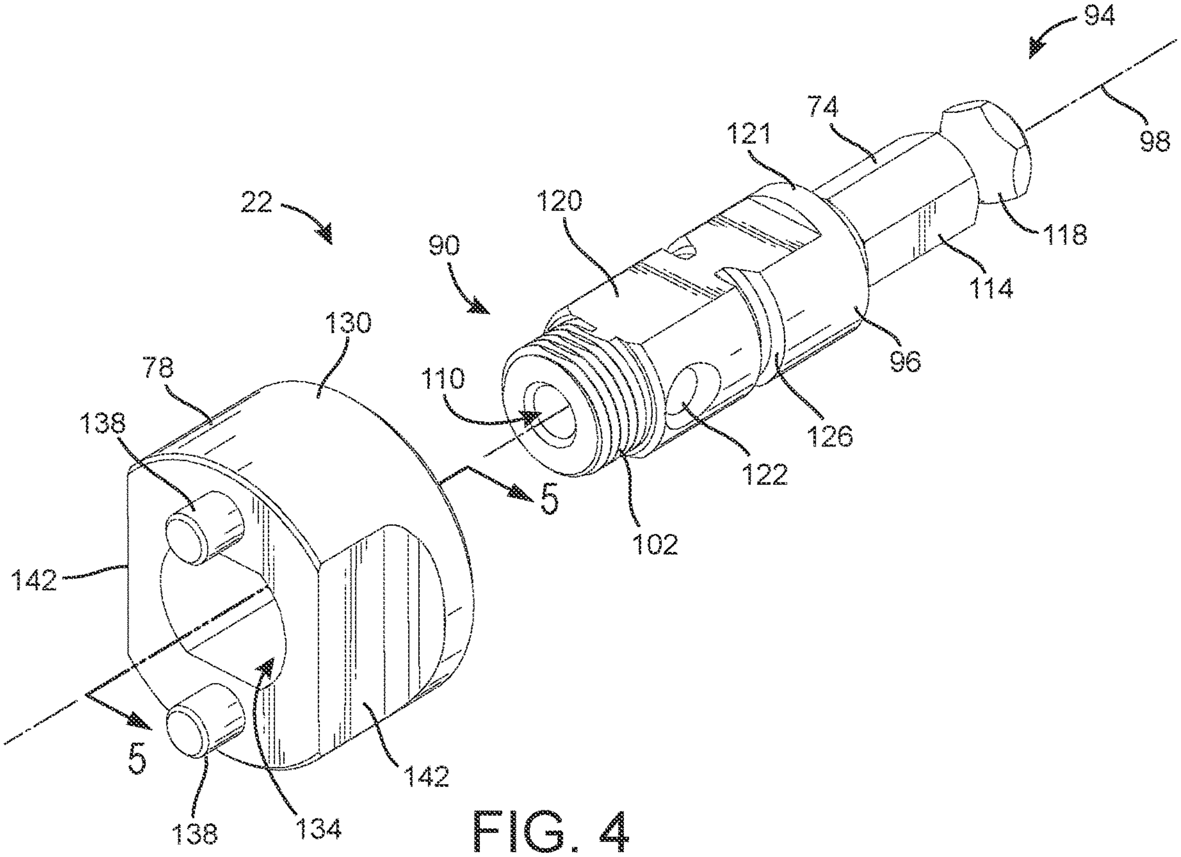
FIG. 4 is an exploded view of the arbor assembly of FIG. 3.

As shown in FIGS. 3 and 4, the arbor assembly includes a shank 74 and a sleeve 78. The shank 74 includes a first end 90, a second end 94, and a body 96 between the first and second ends 90, 94. The shank 74 also defines a longitudinal axis 98 extending through the first and second ends 90, 94. The first end 90 removably couples to the hole saw 14 and the pilot bit 18. In particular, the illustrated first end 90 defines a threaded boss 102 and an opening 110. The end cap (not shown) of the hole saw 14 is threadably coupled to the threaded boss 102 to inhibit removal of the hole saw 14 from the arbor assembly 22. The opening 110 extends into a bore 112 (FIG. 6) formed through part of the shank 74. In the illustrated embodiment, the opening 110 receives the shaft 66 of the pilot bit 18.

The second end 94 of the shank 74 is configured to be coupled to the power tool. In the illustrated embodiment, the second end 94 includes a hex-shaped shaft 114 having an annular groove 118 that is configured to be received in and engaged by a chuck of the power tool. In other embodiments, the second end 94 may include other suitable shafts or coupling mechanisms for connecting to a power tool.

The body 96 is generally cylindrical, but includes one or more flat surfaces 120. The flat surfaces 120 inhibit the sleeve 78 from rotating relative to the shank 74. In the illustrated embodiment, the body 96 includes two flat surfaces 120 on opposing sides of the body 96. In other embodiments, the body 96 may include a single flat surface 120 or may include more than two flat surfaces 120. The flat surfaces 120 define shoulders 121 of the body 96 that inhibit the sleeve 78 from sliding off the body 96. The illustrated body 96 also includes an aperture 122 that extends into the bore 112. In some embodiments, the aperture 122 may receive a ball bearing, a detent, or other projection to removably secure the pilot bit 18 to the arbor assembly 22. The illustrated body 96 further includes a recess 126 (FIG. 4). The recess 126 receives a portion of the sleeve 78 to selectively hold the sleeve 78 in an axial position on the shank 74. In the illustrated embodiment, the recess 126 is an annular recess that is interrupted by the flat surfaces 120. In some embodiments, the body 96 may include a second recess that is axially spaced from the recess 126 (e.g., closer to the shaft 114) to selectively hold the sleeve 78 in a second axial position on the shank 74.

The sleeve 78 is supported by the shank 74 and movable relative thereto. In particular, the sleeve 78 is slidable along the shank 74 in a direction parallel to the longitudinal axis 98. The sleeve 78 includes a generally cylindrical body 130, a central bore 134, and a pair of pins 138 extending from the body 130. The pins 138 are received in the apertures in the end cap of the hole saw 14 when the sleeve 78 engages the hole saw 14 to inhibit the hole saw 14 from being unthreaded from the threaded boss 102. The body 130 includes a pair of indents 142 that provide an ergonomic surface for manipulating the sleeve 78 along the shank 74. The central bore 134 receives the shank 74 when the arbor assembly 22 is assembled. The cross-section of the central bore 134 is similar to the cross-section of the body 130 of the shank 74.

As such, when the arbor assembly 22 is assembled, relative rotation of the sleeve 78 to the shank 74 is inhibited.

Figure 5:
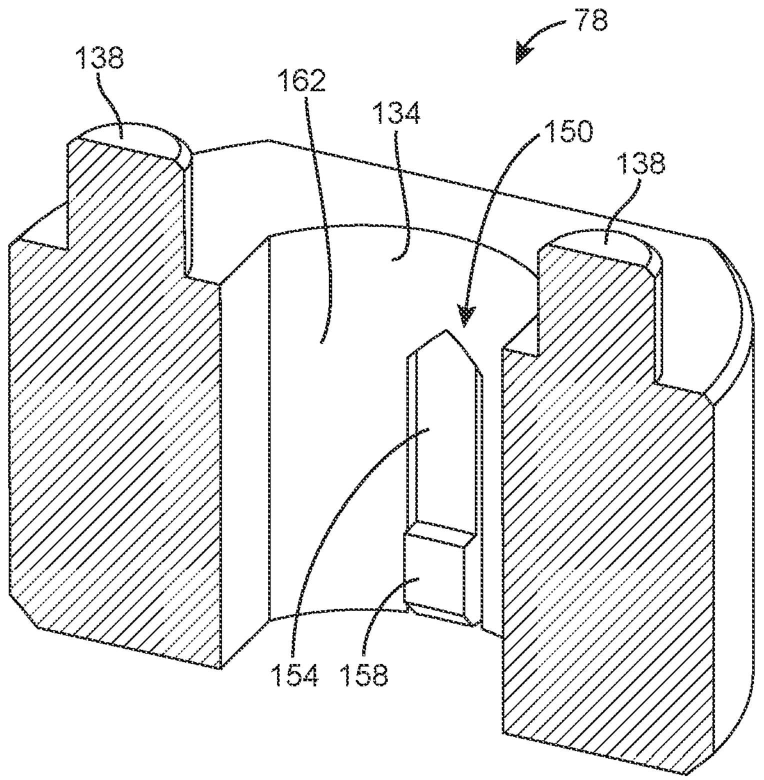
FIG. 5 is a cross-sectional view of an arbor of the arbor assembly of FIG. 4 taken along lines 5-5 of FIG. 4.

Moving to FIG. 5, the sleeve 78 includes a locking member 150 is positioned within the central bore 134. In the illustrated embodiment, the locking member 150 is a cantilevered member. More particularly, the locking member 150 is a cantilevered leaf spring. The locking member 150 includes a stem 154 and a detent 158. The locking member 150 is resilient and is movable radially towards and from the longitudinal axis 98. In the illustrated embodiment, the locking member 150 is biased in a direction radially towards the longitudinal axis 98 so that the stem 154 is generally flush with an interior surface 162 of the central bore 134 and that the detent 158 extends into the central bore 134. The locking member 150 is biased naturally due to the material of the sleeve 78 (e.g., metal). The sleeve does not include any additional elements (e.g., springs) to bias the locking member 150 toward the longitudinal axis 98.

In the illustrated embodiment, the sleeve 78 is produced through an additive manufacturing process such as 3D printing, rapid prototyping, fused deposition modeling, or the like. The sleeve 78 is preferably made from a metal such as 4140 carbon steel. In some embodiments, the sleeve 78 is made from a first material and the shank 74 is made from a second material that is different from the first material. In other embodiments, the sleeve 78 and the shank 74 may be made from the same material. In further embodiments, both the sleeve 78 and the shank 74 may be produced using an additive manufacturing process. The additive manufacturing process allows the sleeve 78 and the locking member 150 to be integrally formed. As such, the sleeve 78 (with the locking member 150) is a single, monolithic piece. Such an arrangement reduces the number of components needed to form and assemble the arbor assembly 22.

Figure 6:
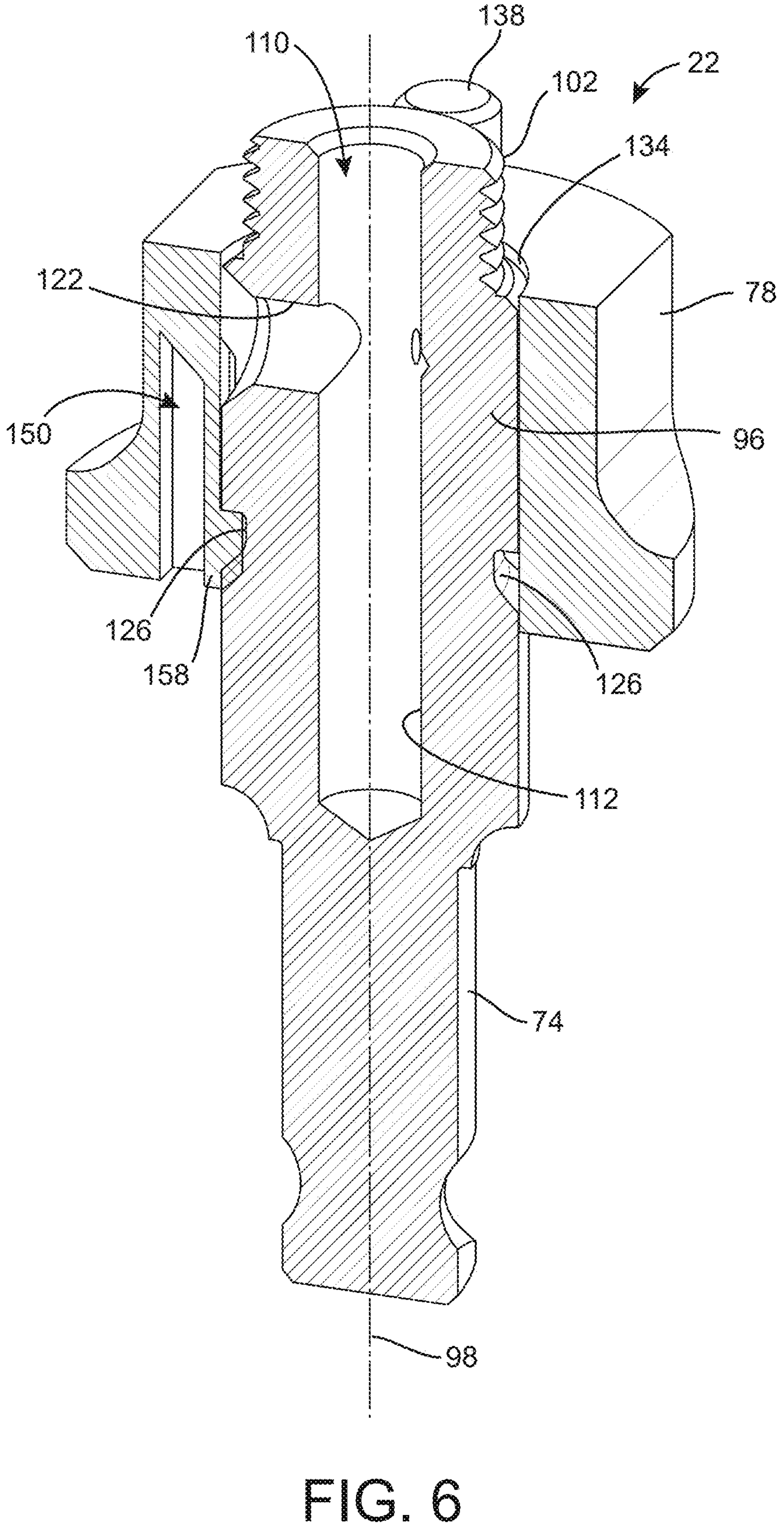
FIG. 6 is a cross-sectional view of the arbor assembly of FIG. 3 taken along lines 6-6 of FIG. 3, with a sleeve of the arbor assembly in a first position.
Figure 7:
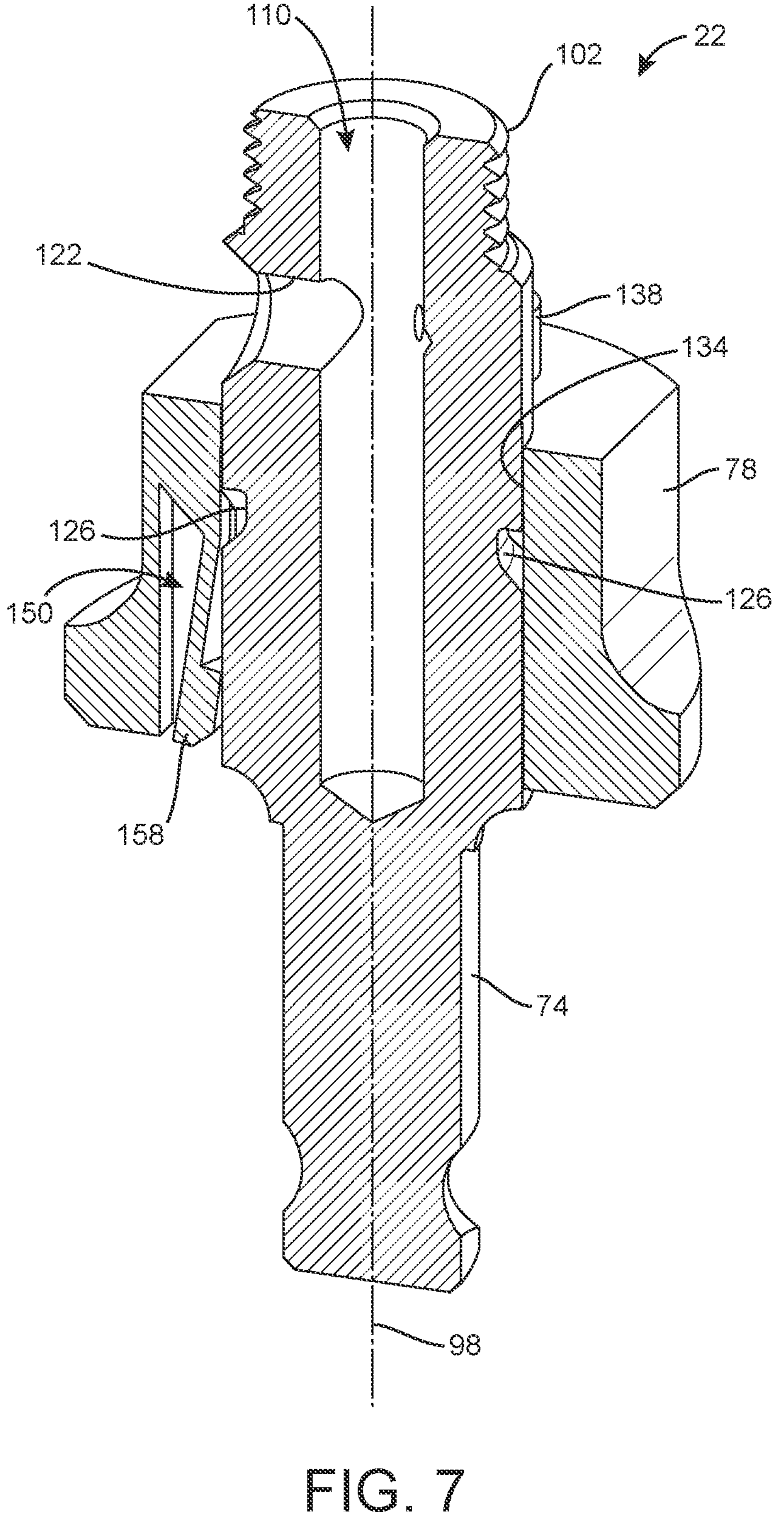
FIG. 7 is a cross-sectional view of the arbor assembly of FIG. 3 taken along lines 6-6 of FIG. 3, with the sleeve of the arbor assembly in a second position.

With reference to FIGS. 6 and 7, during operation of the cutting tool 10, the sleeve 78 is axially slidable along the longitudinal axis 98 relative to the shank 74 to secure the hole saw 14 to the arbor assembly 22. Specifically, the sleeve 78 is slidable between a first position (FIG. 6), in which, the sleeve 78 engages the hole saw 14 and the locking member 150 engages the recess 126, and a second position (FIG. 7), in which the sleeve 78 is spaced apart from the hole saw 14 and the locking member 150 is spaced apart from the recess 126. In other words, the sleeve 78 moves in a direction away from the first end 90 of the shank 74 when moved from the first position to the second position. When in the second position, a user may thread the end cap of the hole saw 14 onto the threaded boss 102 of the shank 74. Meanwhile, the body 96 forces the locking member 150 against the bias radially away from the longitudinal axis 98. The shoulder 121 inhibits the sleeve 78 from sliding off the shank 74 in a direction towards the second end 94. With the hole saw 14 threaded on the shank 74, a user may slide the sleeve 78 in a direction towards the first end 90 of the shank 74 until the detent 158 of the locking member 150 reaches the recess 126. When the locking member 150 reaches the recess, the detent 158 is biased into the recess 126. Simultaneously, the pins 138 extend through the apertures in the end cap of the hole saw 14 to inhibit the hole saw 14 from being unthreaded from the threaded boss 102. With the detent 158 within the recess 126, relative axial movement between the shank 74 and the sleeve 78 is inhibited.

Providing an arbor assembly 22 including a sleeve 78 with an integrally formed locking member 150 eliminates multiple components that are required to secure a shank to an arbor. Previous hole saw arbor assemblies required components such as ball detents, springs, setscrews, push pins etc. These components would often get jammed or wear down, causing them to lose their ability to effectively remove the arbor from the shank. Having a single component, such as the cantilevered leaf spring, provides a simple way to manufacture and assemble an arbor assembly. In addition, producing the sleeve 78 using an additive manufacturing process reduces the cost and the total amount of manufacturing steps to produce the cantilevered leaf spring.

Figure 8:
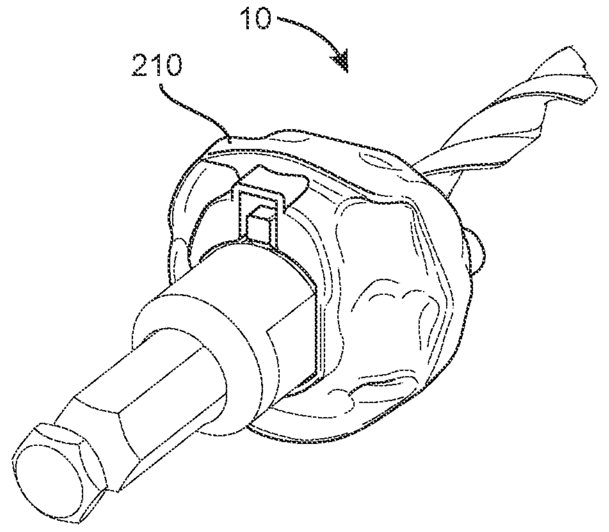
FIG. 8 is a perspective view of the cutting tool of FIG. 1 with a sleeve according to another embodiment.

FIG. 8 illustrates the cutting tool 10 of FIG. 1 with a sleeve 210 according to another embodiment of the invention. The sleeve 210 is similar to the sleeve 78 described above with like features being represented with like reference numerals. In addition, the sleeve 210 functions and operates in a similar manner as the sleeve 78. As such, only features that vary will be described below. The topology of the sleeve 210 is different than the sleeve 78. Specifically, an outside surface 214 of the cylindrical body 130 of the sleeve 210 is contoured. In comparison, the outside surface of the cylindrical body 130 of the sleeve 78 is smooth with a generally curved and flat surfaces.

Figure 9:
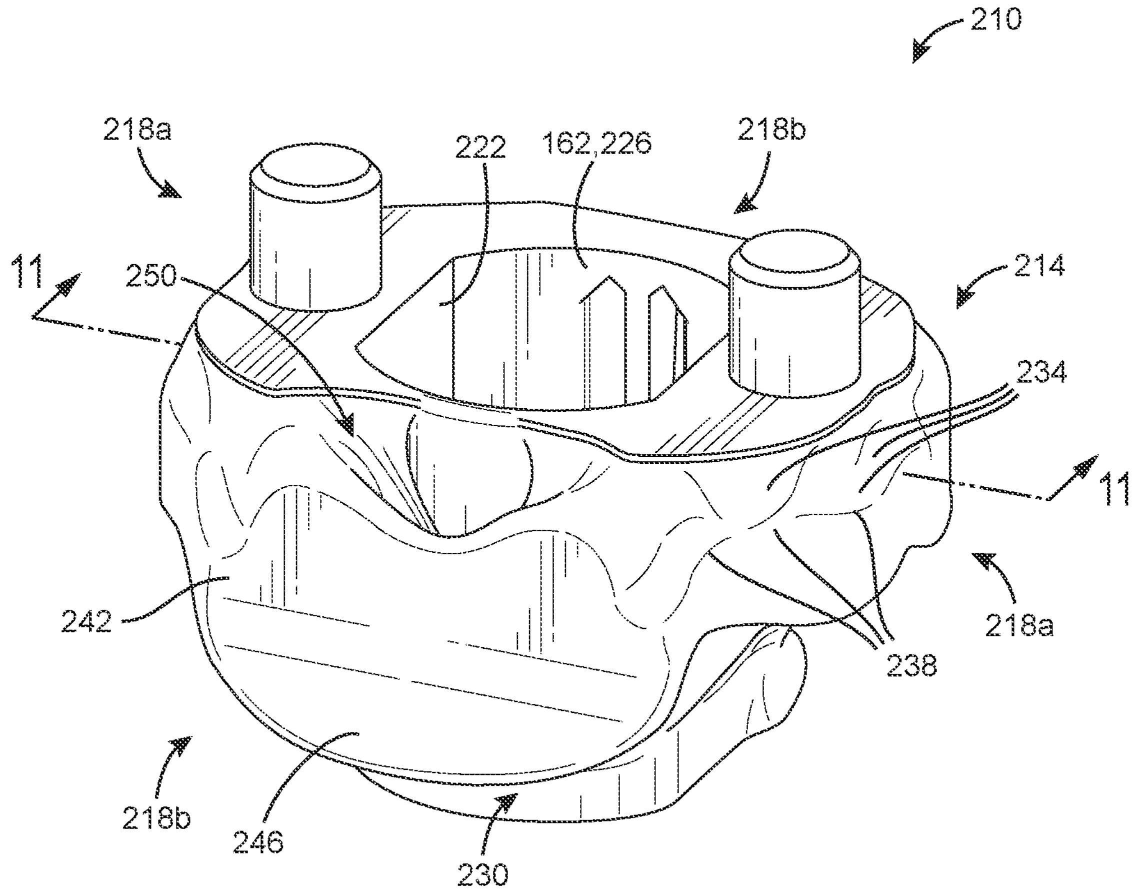
FIG. 9 is a perspective view of the sleeve of FIG. 8.
Figure 10:
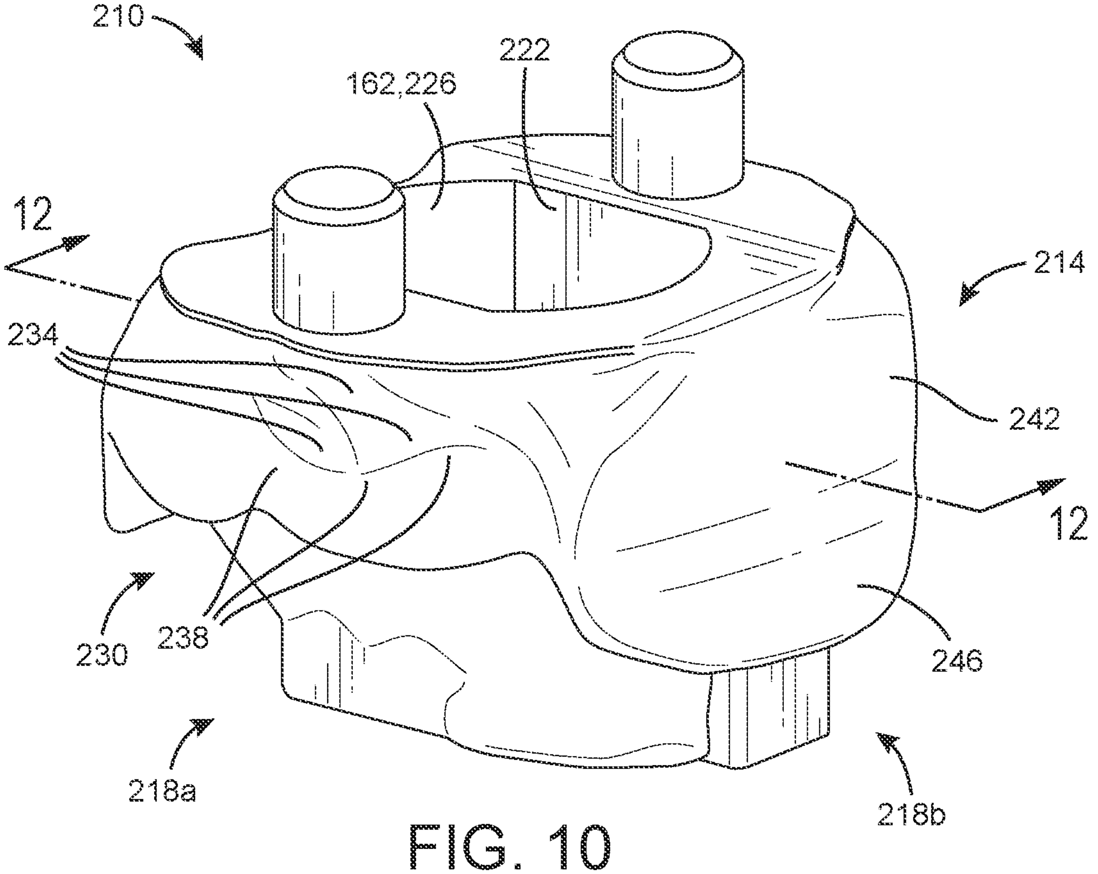
FIG. 10 is another perspective view of the sleeve of FIG. 8.

With reference to FIGS. 9 and 10, the contoured outside surface 214 of the cylindrical body 130 includes four sides 218 each approximately spanning 90 degrees of the outside surface 214. A first pair of sides **218*a* are on diametrically opposite sides 218 of the central bore 134 and a second pair of sides 218*b* are on diametrically opposite sides 218 of the central bore 134. In other words, the sides 218*a* are separated circumferentially about the longitudinal axis 98 by one of the sides 218*b*. The sides 218*a* correspond to flat surfaces 222 of the interior surface 162 of the central bore 134 so that the sides 218*a* are radially spaced from the flat surfaces 222 of the interior surface 162. Similarly, the sides 218*a* correspond to curved surfaces 226 of the interior surface 162 so that the sides 218*b* are radially spaced from the curved surfaces 226 of the interior surface 162. In the illustrated embodiment, the cylindrical body 130 is mushroom-shaped. In other words, an upper portion of the sides 218 protrude radially further outwards from the longitudinal axis 98 than a lower portion of the sides 218. A recess 230 is defined beneath the upper portions of the sides 218 and radially in front of the lower portions of the sides 218. The recess 230 extends circumferentially about the cylindrical body 130**.

The sides **218*a* include a plurality of dents 234 or dimples that extend over the entire surface of the sides 218*a*. In other embodiments, the dents 234 may only extend over a portion of the surface of sides 218. The dents 234 may include flat surfaces, jagged surfaces, or curved surfaces. Ridges 238 are defined between the dents 234. The ridges 238 define a maximum extreme of the surface of the sides 218*a*. Conversely, the dents 234 define a minimum extreme of the surface of the sides 218*a*. The sides 218*b* are similarly shaped to mirror the indents 142 of the sleeve 78 to assist in manipulating the sleeve 210. The sides 218*b* include a generally linear surface 242 and a lip 246 extending radially away from the linear surface 242. Each lip 246 extends away from the linear surface 242 at an angle. In some embodiments, each lip 246 extends away from the linear surface 242 at an oblique angle. In other embodiments, each lip 246 may extend away from the linear surface 242 at an angle between 0 degrees and 90 degrees. The lips 246 separate the upper and lower portions of the sides 218*b* to further define the recess 230. In some embodiments, the linear surfaces 242 may also include dents 234 so that the linear surfaces 242 are contoured. In other embodiments, the linear surfaces 242 may be smooth or flat. The sides 218*b* also include cavities 250. The cavities 250 are areas where material is not applied to the sleeve 210 during an additive manufacturing process. In the illustrated embodiment, each side 218*b* include a single cavity 250. In other embodiments, each side 218*b* may include multiple cavities 250. In further embodiments, only one of sides 218*b* may include a cavity 250. In additional embodiments, the sides 218*a* may include cavities 250. Alternatively, the sleeve 210 may not include a cavity 250**.

Figure 11:
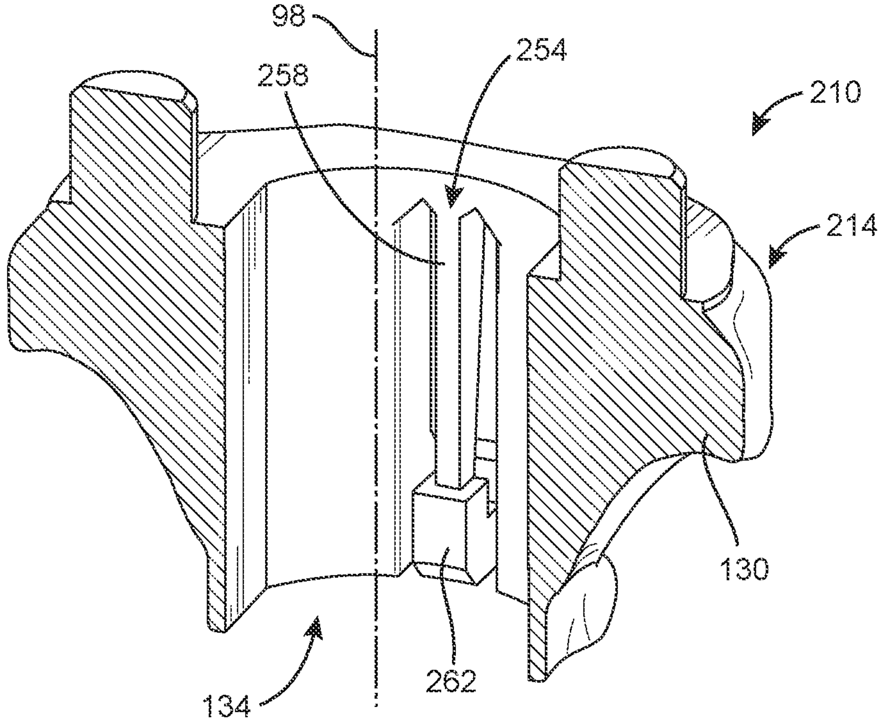
FIG. 11 is a cross-sectional view of the sleeve of FIG. 8 taken along lines 11-11 of FIG. 9.
Figure 12:
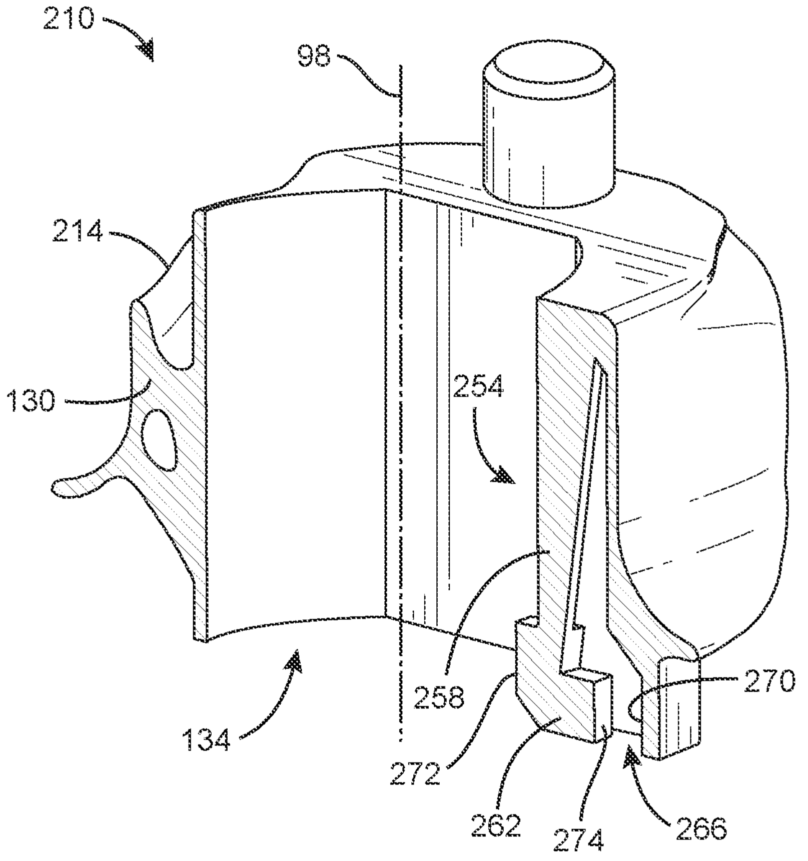
FIG. 12 is a cross-sectional view of the sleeve of FIG. 8 taken along lines 12-12 of FIG. 10

With reference to FIGS. 11 and 12, the sleeve 210 also includes a locking member 254 positioned within the central bore 134. The locking member 254 is similar to the locking mechanism 150, but due to the different geometry of the outside surface 214 of the sleeve 210, the geometry of the locking member 254 is different. The locking member 254 is a cantilevered member. More particularly, the locking member 254 is a cantilevered leaf spring. The locking member 254 includes an elongated stem 258 and a detent 262. The elongated system 258 and the detent 262 define a chamber 266 of the cylindrical body 130 having a back wall 270 (FIG. 12). The elongated stem 258 extends a majority of a length of the sleeve 210 in a direction parallel to the longitudinal axis 98. The detent 262 is positioned at an end to the elongated stem 258. The detent 262 includes a width that is greater than the width of the elongated stem 258 in a direction perpendicular to the longitudinal axis 98. The locking member 254 is resilient and is movable radially towards and from the longitudinal axis 98. In the illustrated embodiment, the locking member 254 is biased in a direction radially towards the longitudinal axis 98 so that the elongated stem 258 is generally flush with an interior surface 162 of the central bore 134 and that a portion 272 of the detent 262 extends into the central bore 134. The locking member 254 is biased due to the material of the sleeve 78 (e.g., metal). The sleeve 210 does not include any additional elements (e.g., springs) to bias the locking member 254 toward the longitudinal axis 98. During a cutting operation, as described above, when the body 96 of the shank 74 forces the locking member 254 against the bias radially away from the longitudinal axis 98, a portion 274 (FIG. 12) of the detent 262 contacts the back wall 270 to limit movement of the locking member 254.

Providing the sleeve 210 with the dents 234, the cavities 250, and the recess 230 lowers the amount of material required to produce the sleeve 210. Lowering the amount of material required to produce the sleeve 210 significantly lowers the amount of time required to produce the sleeve 210 during an additive manufacturing process. Further, lowering the amount of material required to produce the sleeve 210 also lowers the material costs.

Various features and advantages are set forth in the following claims.

What is claimed is:

1. A cutting tool comprising:

a hole saw; and an arbor assembly removably coupled to the hole saw, the arbor assembly including, a shank having a first end, a second end opposite the first end and configured to be coupled to a power tool, a body between the first and second ends, and an longitudinal axis extending centrally through the shank between the first and second ends, the body including a recess, and a sleeve supported by the shank, the sleeve including a central bore that receives the shank and a locking member positioned in the central bore, the locking member being a single, monolithic piece with a remainder of the sleeve, the sleeve moveable between a first position, in which the locking member engages the recess to inhibit axial movement of the sleeve relative to the shank, and a second position, in which the locking member is spaced apart from the recess;

wherein the locking member is a cantilevered leaf spring.

2. The cutting tool of claim 1, wherein the sleeve is produced using an additive manufacturing process.

3. The cutting tool of claim 1, further comprising a pilot bit removably coupled to the shank.

4. The cutting tool of claim 1, wherein the locking member is biased towards the longitudinal axis.

5. The cutting tool of claim 1, wherein the recess includes a shoulder surface extending in a radial direction towards the longitudinal axis.

6. The cutting tool of claim 5, wherein the shoulder surface inhibits axial movement of the sleeve in a direction towards the first end of the shank.

7. The cutting tool of claim 5, wherein the recess further includes an inclined surface that is angled relative to the longitudinal axis.

8. The cutting tool of claim 1, wherein the sleeve moves in a direction away from the first end of the shank as the sleeve is moved from the first position to the second position.

9. The cutting tool of claim 1, wherein the recess is an annular recess that is interrupted by a flat surface.

* * * * *